US012676942B2

(12) United States Patent
Kim et al.

(10) Patent No.:  US 12,676,942 B2
(45) Date of Patent:       Jul. 7, 2026

(54) ELECTRONIC DEVICE AND METHOD FOR GENERATING SYNTHESIZED IMAGES USING REGION-SPECIFIC EXPOSURE TIMES BASED ON MOTION MAPPING

(71) Applicant: SAMSUNG ELECTRONICS CO., LTD., Suwon-si (KR)

(72) Inventors: Dohan Kim, Suwon-si (KR);
Jeonghoon Park, Suwon-si (KR);
Changwoo Lee, Suwon-si (KR);
Jaehun Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 211 days.

(21) Appl. No.: 18/243,633

(22) Filed:     Sep. 7, 2023

(65)             Prior Publication Data

US 2024/0080407 A1     Mar. 7, 2024

Related U.S. Application Data

(63) Continuation      of      application      No. PCT/KR2023/008218, filed on Jun. 14, 2023.

(30)        Foreign Application Priority Data

Sep. 7, 2022    (KR) ........................ 10-2022-0113678
Sep. 29, 2022    (KR) ........................ 10-2022-0124190

(51) Int. Cl.
*H04N 5/265*          (2006.01)
*G06T 7/246*          (2017.01)
(Continued)

(52) U.S. Cl.
CPC ............. *H04N 5/265* (2013.01); *G06T 7/248* (2017.01); *H04N 23/62* (2023.01); *H04N 23/73* (2023.01);
(Continued)

(58) Field of Classification Search
CPC ...... H04N 5/265; H04N 25/50; H04N 23/683; H04N 23/76; H04N 23/73; H04N 23/951;
(Continued)

(56)             References Cited

U.S. PATENT DOCUMENTS 8,488,006 B2 *   7/2013  Miyazaki ............... H04N 23/73
                                                      348/221.1
9,635,276 B2 *   4/2017  Sen ......................... G06T 7/215
(Continued)

FOREIGN PATENT DOCUMENTS

JP        2008035028 A      2/2008
JP        4483962 B2      4/2010
(Continued)

OTHER PUBLICATIONS

International Search Report and Written Opinion for International Application No. PCT/KR2023/008218; International Filing Date Jun. 14, 2023; Date of Mailing Sep. 7, 2023; 11 Pages.
(Continued)

*Primary Examiner* — Kelly L Jerabek
(74) *Attorney, Agent, or Firm* — CANTOR COLBURN LLP

(57)             ABSTRACT

An electronic device according to an embodiment includes an image sensor and at least one processor operatively connected to the image sensor. The at least one processor may be configured to generate a motion map for identifying at least one region of a plurality of image frames as a stop area or a motion area, based on at least a part of the plurality of image frames acquired from the image sensor, set a first exposure time corresponding to the motion area and a second exposure time corresponding to the stop area, based on the generated motion map, acquire a first image corresponding to the first exposure time and a second image corresponding to the second exposure time from the image (Continued)

sensor, and generate a synthesized image by synthesizing the acquired first image and second image, based on the motion map.

19 Claims, 18 Drawing Sheets

(51) Int. Cl.

| | |
|---|---|
| *H04N 23/62* | (2023.01) |
| *H04N 23/68* | (2023.01) |
| *H04N 23/73* | (2023.01) |
| *H04N 23/76* | (2023.01) |
| *H04N 25/50* | (2023.01) |

(52) U.S. Cl.
CPC ............. *H04N 23/76* (2023.01); *H04N 25/50* (2023.01); *G06T 2207/10016* (2013.01); *G06T 2207/10144* (2013.01); *G06T 2207/20221* (2013.01); *H04N 23/683* (2023.01)

(58) Field of Classification Search
CPC .... H04N 23/6811; H04N 23/62; G06T 7/248; G06T 7/00; G06T 5/50; G06T 2207/10016; G06T 2207/10144; G06T 2207/20201; G06T 2207/20221
See application file for complete search history.

(56) References Cited

U.S. PATENT DOCUMENTS

| | | | |
|---|---|---|---|
| 10,904,452 | B2 | 1/2021 | Choi et al. |
| 2009/0244318 | A1 | 10/2009 | Makii |
| 2009/0278964 | A1 | 11/2009 | Mcgarvey et al. |
| 2010/0091119 | A1 | 4/2010 | Lee |
| 2013/0070965 | A1 | 3/2013 | Jang et al. |
| 2014/0168429 | A1 | 6/2014 | Ono |
| 2017/0230562 | A1 | 8/2017 | Gupta et al. |
| 2019/0378255 | A1 | 12/2019 | Taya |
| 2020/0357102 | A1 | 11/2020 | Pekkucuksen et al. |
| 2021/0409588 | A1 | 12/2021 | Dong |
| 2022/0020128 | A1* | 1/2022 | Roy .......................... G06T 5/90 |
| 2022/0021800 | A1 | 1/2022 | Itoh |
| 2022/0138964 | A1 | 5/2022 | Gintsburg et al. |
| 2022/0392032 | A1* | 12/2022 | Mallick .................. G06V 10/82 |
| 2023/0021726 | A1* | 1/2023 | Le .......................... G06T 3/4015 |
| 2023/0029348 | A1* | 1/2023 | Bauer ................... H04N 25/50 |

FOREIGN PATENT DOCUMENTS

| | | |
|---|---|---|
| JP | 2014060779 A | 4/2014 |
| JP | 2014179863 A | 9/2014 |
| JP | 2019213164 A | 12/2019 |
| KR | 20000047059 A | 7/2000 |
| KR | 20030027440 A | 4/2003 |
| KR | 20130031574 A | 3/2013 |
| KR | 20190075292 A | 7/2019 |

OTHER PUBLICATIONS

Extended European Search Report Issued In EP Application No. 23863306.9-1207; Mail Date Sep. 9, 2025; 8 Pages.

* cited by examiner

400

Exposure time 1

Exposure time 2

Exposure time 3

Image Frame

Motion Map

1300

ELECTRONIC DEVICE AND METHOD FOR GENERATING SYNTHESIZED IMAGES USING REGION-SPECIFIC EXPOSURE TIMES BASED ON MOTION MAPPING

CROSS-REFERENCE TO RELATED APPLICATIONS

This application is a continuation of International Application No. PCT/KR2023/008218, filed on Jun. 14, 2023, which is based on and claims priority to Korean Patent Application No. 10-2022-0124190, filed on Sep. 29, 2022, in the Korean Intellectual Property Office, and Korean Patent Application No. 10-2022-0113678, filed on Sep. 7, 2022, in the Korean Intellectual Property Office, the disclosures of which are incorporated by reference herein in their entireties.

BACKGROUND

The disclosure relates to an electronic device for providing a long exposure image for which an exposure time is adjusted and a method of operating the same.

Recently, electronic devices including camera modules such as digital cameras, digital camcorders, or smartphones have increased in popularity. The electronic device including the camera module may provide various functions related to photographing. For example, the electronic device may output a preview image acquired from the camera module to a display and acquire a captured image from the camera module when a shutter operates. Further, the electronic device may provide functions such as autofocus, auto-exposure setting, zoom-in, zoom-out, continuous shooting, timer shooting, flash on/off, or filtering.

In order to take an image of appropriate exposure, the camera module may appropriately control an amount of light by adjusting an exposure time through the shutter and, accordingly, implement a long-exposure effect. It is possible to calculate an average and synthesize a plurality of images for each pixel to implement the long-exposure effect, thereby recording motion of subjects included in the plurality of images in one image.

SUMMARY

An electronic device according to an embodiment of the disclosure may include an image sensor and at least one processor operatively connected to the image sensor. The at least one processor may be configured to generate a motion map for identifying at least one region of a plurality of image frames as one of a stop area and a motion area, based on at least a part of the plurality of image frames acquired from the image sensor. The at least one processor may be configured to set a first exposure time corresponding to the motion area and a second exposure time corresponding to the stop area, based on the generated motion map. The at least one processor may be configured to acquire a first image corresponding to the first exposure time and a second image corresponding to the second exposure time from the image sensor. The at least one processor may be configured to generate a synthesized image by synthesizing the acquired first image and second image, based on the motion map.

A method of operating an electronic device according to an embodiment of the disclosure may include generating a motion map for identifying at least one region of a plurality of image frames as one of a stop area and a motion area, based on at least a part of the plurality of image frames acquired from an image sensor. The method may include setting a first exposure time corresponding to the motion area and a second exposure time corresponding to the stop area, based on the generated motion map. The method may include acquiring a first image corresponding to the first exposure time and a second image corresponding to the second exposure time from the image sensor. The method may include generating a synthesized image by synthesizing the acquired first image and second image, based on the motion map.

An electronic device according to an embodiment of the disclosure may include an image sensor and at least one processor operatively connected to the image sensor. The at least one processor may be configured to set an exposure time of an image frame, based on an output image acquired from the image sensor. The at least one processor may be configured to set a readout cycle of the image frame to correspond to the configured exposure time. The at least one processor may be configured to acquire the image frame according to the configured exposure time from the image sensor, based on the configured readout cycle.

A non-transitory computer-readable storage medium storing one or more programs according to an embodiment of the disclosure may include generating a motion map for identifying at least one region of a plurality of image frames as one of a stop area and a motion area, based on at least a part of the plurality of image frames acquired from an image sensor, based on execution of an application. The storage medium may include setting a first exposure time corresponding to the motion area and a second exposure time corresponding to the stop area, based on the generated motion map. The storage medium may include acquiring a first image corresponding to the first exposure time and a second image corresponding to the second exposure time from the image sensor. The storage medium may include synthesizing the acquired first image and second image to generate a synthesized image, based on the motion map.

DETAILED DESCRIPTION

Figure 1:
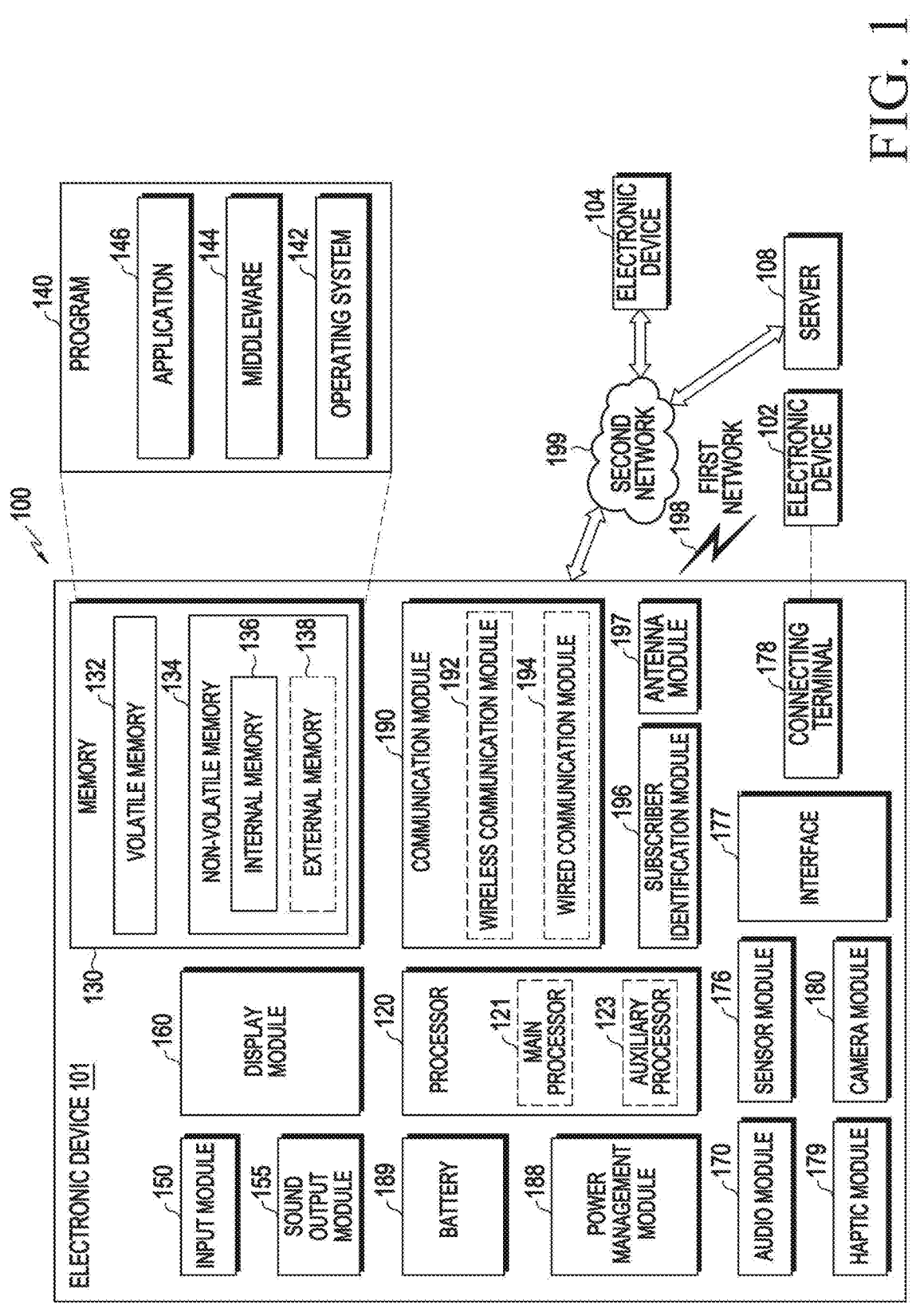
FIG. 1 is a block diagram of an electronic device within a network environment according to an embodiment of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least a part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least a part of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least a part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least a part of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least a part of the function or the service. The one or more external electronic devices receiving the request may perform the at least a part of the function or the service requested, or an additional function or an additional service related to the request, and transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
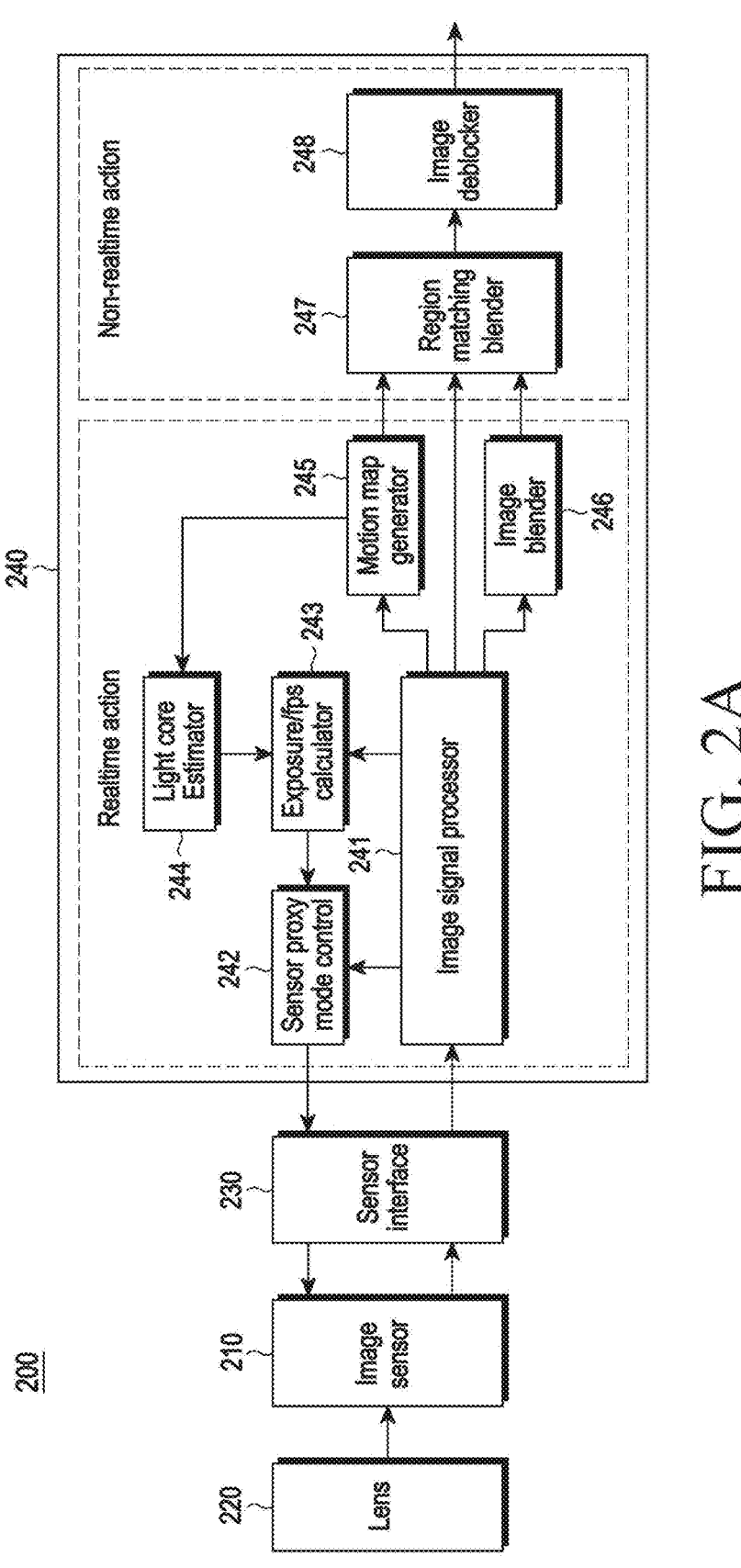
FIG. 2A is a block diagram of the electronic device according to an embodiment of the disclosure.

FIG. 2A is a block diagram of an electronic device 200 according to an embodiment of the disclosure.

Referring to FIG. 2A, the electronic device 200 according to an embodiment may include an image sensor 210, a lens 220, a sensor interface 230, and/or a processor 240 (for example, the processor 120 of FIG. 1).

The image sensor 210 according to an embodiment may be a camera (for example, the camera module 180 of FIG. 1) capable of capturing a subject and acquiring an image. The image sensor 210 may receive light incident from the subject through the lens 220 and acquire an image.

The processor 240 according to an embodiment may receive an image frame acquired from the image sensor 210 through the sensor interface 230. As an embodiment, the processor 240 may acquire one or more image frames corresponding to respective exposure times from the image sensor 210 and acquire images on the basis of the one or more image frames.

As an embodiment, the processor 240 may include an image signal processor (ISP) 241 for processing the operation of the image sensor 210 and the image frames acquired from the image sensor 210. As an embodiment, the processor 240 may include software modules (for example, a sensor proxy mode control 242, an exposure/frames per second (fps) calculator 243, a light core estimator 244, a motion map generator 245, an image blender 246, a region matching blender 247, and/or an image de-blocker 248) including at least one executed instruction, and the operation may be understood as the operation of the processor 240. The software modules are not limited to the configuration of the modules illustrated in FIG. 2A, and at least one module may be merged or deleted, or a new module may be further added.

As an embodiment, the sensor proxy mode control 242 may control the operation timing of the image sensor 210 as described below.

As an embodiment, the exposure/fps calculator 243 may set an exposure time of the image frame on the basis of an output image acquired from the image sensor 210. The exposure/fps calculator 243 may determine an fps of the camera module including the image sensor 210 and determine the exposure time on the basis of the output image of the image sensor 210.

As an embodiment, the exposure/fps calculator 243 may set an exposure time of an individual image frame on the basis of an amount of light of the image input into the image sensor 210. For example, when calculating the exposure time on the basis of the image output from the image sensor 210, the exposure/fps calculator 243 may calculate an average exposure of all images or apply a weighting factor to some regions having a large exposure difference.

Further, the exposure/fps calculator 243 may set a readout cycle of the image frame to correspond to the configured exposure time. The exposure/fps calculator 243 may set the readout cycle as a reciprocal number of the exposure time of the image frame to make a readout operation of a previous image frame correspond to a reset operation of the following image frame among a plurality of consecutive image frames. For example, as described below with reference to FIG. 6, when the exposure time is configured as $\frac{1}{40}$ [sec], the readout cycle may be configured as $\frac{1}{40}$ [sec] and/or the fps may be configured as 40 [frame].

As an embodiment, the light core estimator 244 may predict a glare degree according to an exposure time of a light source included in the image frame as described below.

As an embodiment, the motion map generator 245 may generate a motion map for identifying at least one region of a plurality of image frames as a stop area or a motion area on the basis of at least a part of the plurality of image frames. As an embodiment, in the motion map, some regions may be displayed as stop areas or some regions may be displayed as motion areas.

As an embodiment, the image blender 246 may synthesize a plurality of image frames. The image blender 246 may acquire a plurality of image frames corresponding to an exposure time output by the exposure/fps calculator 243 and synthesize the plurality of acquired image frames in real time to acquire an image. As an embodiment, the image blender 246 may acquire a first image by synthesizing a plurality of first image frames corresponding a first exposure time. In response thereto, a second image may be a single second image corresponding to a second exposure time and may be acquired from the image sensor 210 before or after the plurality of first image frames are acquired.

As an embodiment, the region matching blender 247 may synthesize the first image corresponding to the first exposure time and the second image corresponding to the second exposure time on the basis of a final motion map finally acquired by the motion map generator 245. As an embodiment, the region matching blender 247 may generate a synthesized image obtained by synthesizing the first image corresponding to the motion area and the second image corresponding to the stop area in the final motion map.

As an embodiment, the image de-blocker 248 may generate a final image by post-processing the synthesized image obtained by synthesizing the first image and the second image.

As an embodiment, the image signal processor 240 may set the exposure time of the image frame acquired by the image sensor 210 on the basis of the average brightness of all pixels of the image frame. When a brightness difference between a light source and a surrounding background is large, the image frame according to the configured exposure time may not appropriately express the light source and the surrounding background. Particularly, a possibility of the generation of light saturation is high in the light source and pixels therearound, and when the captured images are synthesized, pixels corresponding to the light source may lose color information due to saturation. When individual image frames having saturation are synthesized, the final synthesized image may not also express an accurate color due to saturation of the light source. When the brightness difference between the light source included in the image frame and a surrounding object is large, the exposure time may be configured through another method.

On the other hand, when capturing is performed for the exposure time configured on the basis of the average brightness of all pixels of the image frame, surrounding objects (mainly objects in the stop area) may be darkly captured. Since the final captured result is the average of the plurality of image frames, parts except for a light trajectory may still remain in the dark state. If the exposure time of the sensor is forcedly increased to express dark regions other than the light source, light saturation for the light source may be generated.

Further, when a plurality of images or moving images are captured, unintended image blurring may appear by user hand-shaking. In order to prevent image blurring due to the hand-shaking, an optical image stabilizer (OIS) or digital image stabilizer (DIS) may be used. While OIS may correct shaking without damage to the output image but has a limitation on a correction range, DIS may correct a relatively wide range but may reduce an angle of view after processing in proportion to the correction range. Even though the shaking prevention correction is used, shaking may be left in the output image due to the limit of each scheme in capturing for a long time. In the motion area having motion, user hand-shaking does not give large influence to a quality of the final image. However, in the stop area, when a plurality of images are synthesized, the resolution may deteriorate due to synthesis of subjects existing in different positions, which may influence a quality of a picture.

Figure 2B:
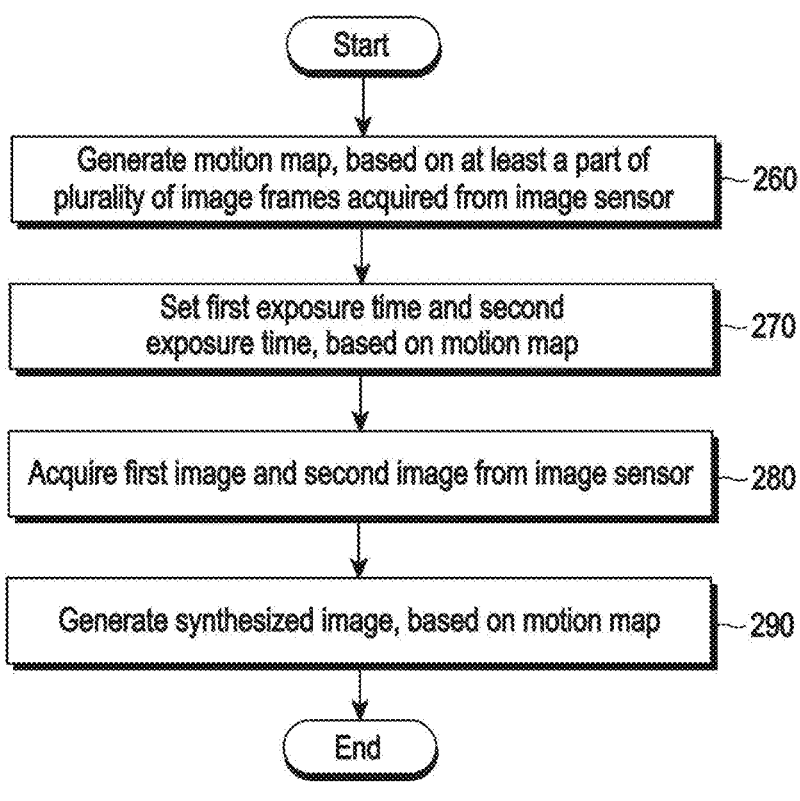
FIG. 2B is a flowchart illustrating a method of operating the electronic device according to an embodiment of the disclosure.

FIG. 2B is a flowchart illustrating a method of operating the electronic device according to an embodiment of the disclosure.

Referring to FIG. 2B, an electronic device (for example, the electronic device 200 of FIG. 2A) according to an embodiment may generate a motion map for identifying at least one region of a plurality of image frames as a stop area or a motion area on the basis of at least a part of the plurality of image frames acquired from an image sensor (for example, the image sensor 210 of FIG. 2A) in operation 260.

The electronic device 200 according to an embodiment may set a first exposure time corresponding to the motion area and a second exposure time corresponding to the stop area on the basis of the generated motion map in operation 270.

The electronic device according to an embodiment may acquire a first image corresponding to the first exposure time and a second image corresponding to the second exposure time from the image sensor 210 in operation 280.

The electronic device according to an embodiment may generate a synthesized image by synthesizing the acquired first image and second image on the basis of the motion map in operation 290.

Figure 3:
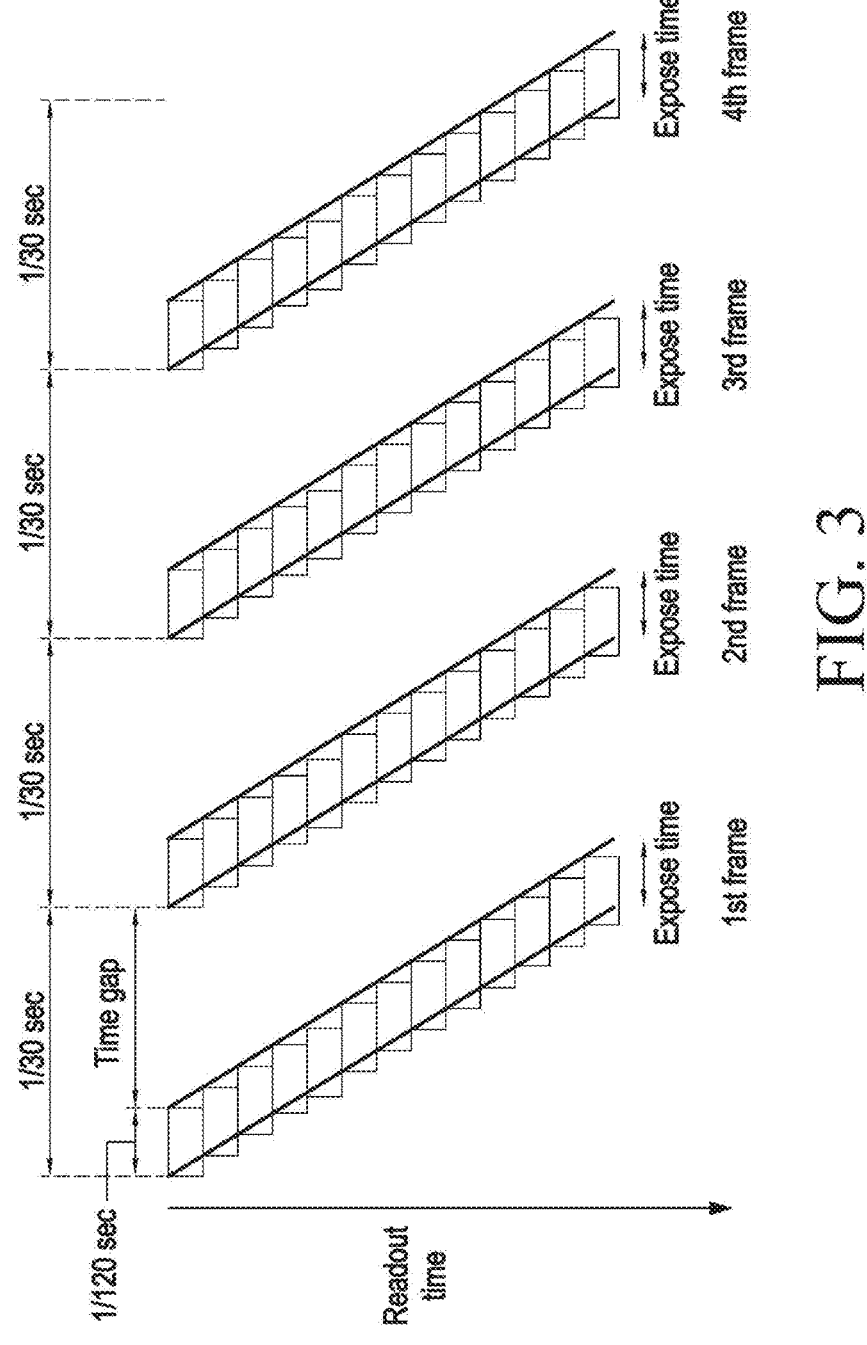
FIG. 3 is a timeline in which image frames are acquired according to an exposure time and a readout cycle of the image sensor according to an embodiment of the disclosure.

FIG. 3 is a timeline in which image frames are acquired according to an exposure time and a readout cycle of the image sensor 210 according to an embodiment of the disclosure.

Referring to FIG. 3, the image sensor 210 according to an embodiment may acquire image frames on the basis of the exposure time and readout cycle configured by the processor 240. For example, the image sensor 210 may control open and close of a shutter for the exposure to light for the configured exposure time and acquire image frames according to a preset readout cycle.

For example, as illustrated in FIG. 3, when a light trajectory is captured in a condition having relatively high illumination (for example, around evening), an exposure time (for example, a shutter speed) may be configured as $1/120$ [sec], a frame per second (fps) of the image sensor may be 30 [frame], and a readout cycle may be preset as $1/30$ [sec]. In this case, a time gap of $3/120$ [sec] may be generated between respective image frames, and accordingly, in the case of an object moving at a high speed, a long time gap may be generated between image frames and thus it may be difficult to make smooth trajectory expression.

Accordingly, an embodiment of the disclosure may reflect, in the image sensor 210, an exposure time that prevents light saturation of the light source in the motion area having motion and expresses well the subject in the stop area. An embodiment of the disclosure may prevent an increase in user hand-shaking generated for the exposure time due to synthesis of image frames and minimize the time gap between image frames, thereby expressing a natural light trajectory in the final image.

Figure 4:
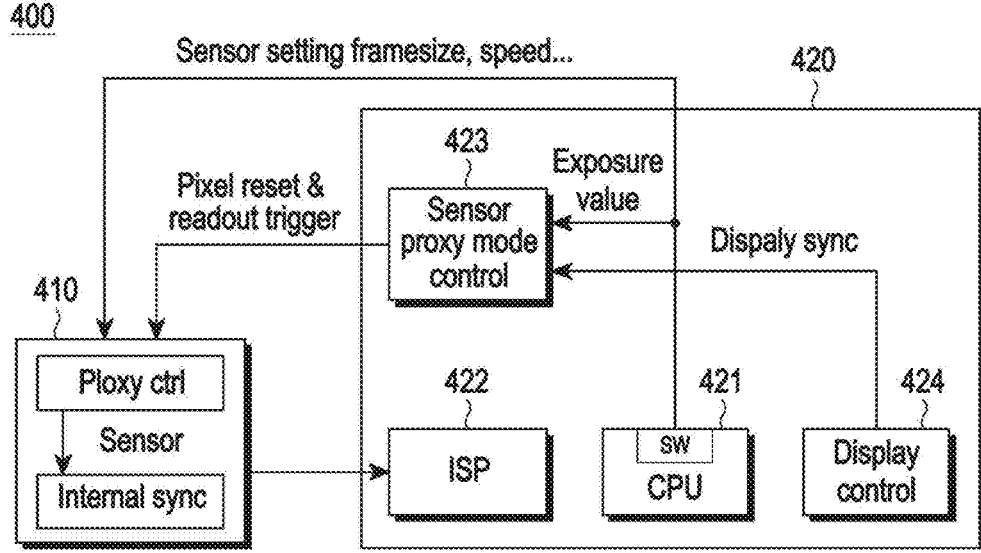
FIG. 4 is a block diagram of the electronic device according to an embodiment of the disclosure.
Figure 5:
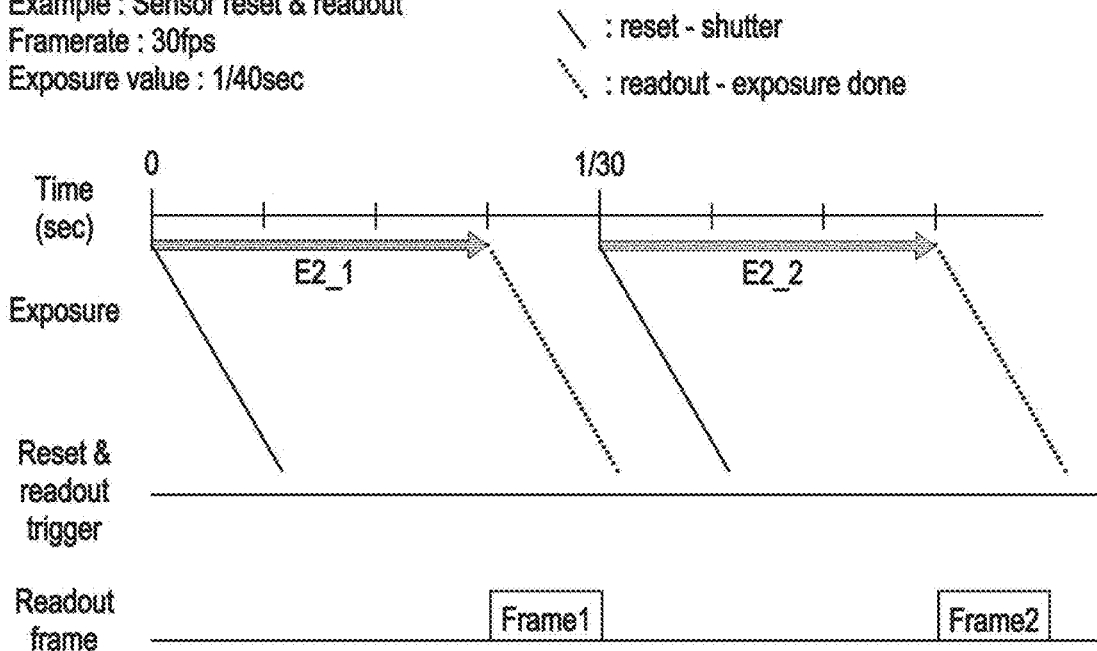
FIG. 5 illustrates an operation signal of the image sensor based on a host mode according to an embodiment of the disclosure.
Figure 6:
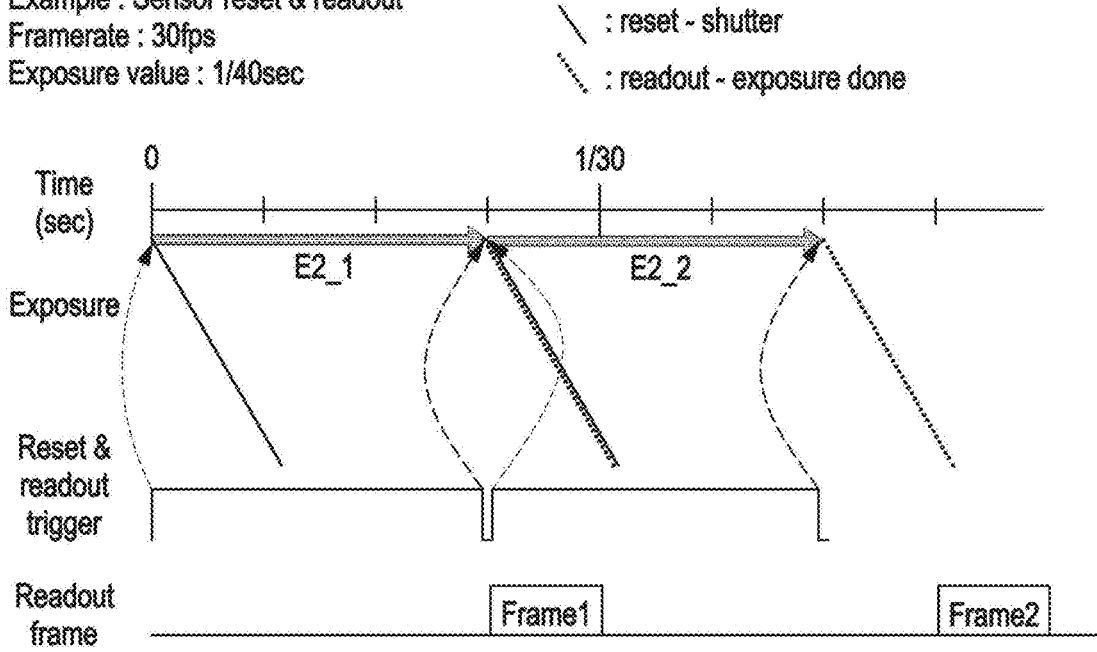
FIG. 6 illustrates an operation signal of the image sensor based on a proxy mode according to an embodiment of the disclosure.

FIG. 4 is a block diagram of an electronic device 400 according to an embodiment of the disclosure. FIG. 5 illustrates operation signals of the image sensor 410 based on a host mode according to an embodiment of the disclosure. FIG. 6 illustrates operation signals of the image sensor 410 based on a proxy mode according to an embodiment of the disclosure.

Referring to FIGS. 4 to 6, the electronic device 400 according to an embodiment may include an image sensor 410 and/or a processor 420 (for example, the processor 120 of FIG. 1 or the processor 240 of FIG. 2A).

As an embodiment, the image sensor 410 may receive an input of various operation modes from the processor and acquire image frames according thereto. As an embodiment, the image sensor 410 may control an exposure time of the image frame and a readout cycle of the image frame on the basis of the acquired output image or the operation mode.

As an embodiment, the processor 420 may include, for example, an application processor (AP). As an embodiment, the processor 420 may operate the image sensor 410 in the host mode as illustrated in FIG. 5. The image sensor 410 may determine operation timing therein on the basis of the operation mode received from the processor 420 in the host mode. As an embodiment, the image sensor 410 may receive an input of the exposure time and the readout cycle (for example, the fps) from the processor 420 in the host mode and determine pixel reset and pixel readout timing therein through a calculation.

Since signals for setting the operation mode of the image sensor 410 do not need a very precise real-time operation in the host mode, an operation mode of software may be transferred to the image sensor 410 in general on the basis of the exposure time of the output image analyzed by hardware. Accordingly, a control type of the processor 420 in the host mode is a non-real time control type that does not directly include the operation timing of the image sensor 410.

According to the host mode, it may be difficult to freely change the exposure time and the readout cycle (for example, fps) in real time, and it may be difficult to know a time point at which the operation mode is actually changed because the application to the inside of the sensor according to an input from the outside and an output scheme of the image frame are different for each image sensor 410.

Further, as illustrated in the example condition, when the fps is 30 [frame] and the exposure time is ¼₀ [sec], a time gap is generated between the time of the individual frame and the exposure time and thus it may be difficult to smoothly express the trajectory.

As an embodiment, the image sensor 410 may operate in the proxy mode as illustrated in FIG. 5. In the proxy mode, the image sensor 410 may receive pixel reset and pixel readout timing from the processor 420 and, accordingly, perform a pixel reset and pixel readout operation.

Accordingly, the image sensor 410 may passively perform the pixel reset and pixel readout operation according to a trigger signal received from the processor 420 (for example, the sensor proxy mode control 423) without a need to receive the exposure time and/or the readout cycle from the processor 420. The remaining information for setting an ADC, a sensor ISP, an interface, and a clock within the image sensor 410 except for the pixel reset and pixel readout trigger signal may be received from the outside.

As an embodiment, the processor 420 may include the sensor proxy mode control 423 as a hardware element for controlling the cell reset and the pixel readout of the image sensor 410. The sensor proxy mode control 423 may gen-erate a trigger signal output to the image sensor 410 to control the cell reset and the pixel readout.

As an embodiment, the electronic device 400 includes a signal line for connecting the image sensor 410 and at least one processor 420, and the sensor proxy mode control 423 may output a trigger signal for the pixel reset and the pixel readout to the image sensor 410 through the hardware signal line. In general, in the case of a software signal, there is a time error in a control signal for each image frame according to load of the CPU 421, and thus the hardware signal line should be provided to perform control in real time such that variability of the control signal is reduced. Further, the control signal should be synchronized with a display sync signal in order to guarantee low latency live view of an image transferred to a display (for example, the display module 160 of FIG. 1). Accordingly, the sensor proxy mode control 423 may receive the display sync signal from the display control 424 for controlling the display.

As an embodiment, the electronic device 400 and the image sensor 410 may be wirelessly connected.

As an embodiment, the sensor proxy mode control 423 may output the trigger signal for the pixel reset and the pixel readout to the image sensor 410 on the basis of the exposure time and/or readout cycle configured by the processor (for example, the exposure/fps calculator of FIG. 2A).

As an embodiment, the image sensor 410 may perform the pixel reset and pixel readout operation on the basis of the received trigger signal and, accordingly, transmit an image frame according to the configured exposure time to the image signal processor (ISP) 422.

According to the electronic device 400 and the method of operating the same according to an embodiment of the disclosure, even when motion of the subject is fast, it is possible to prevent discontinuity of the light trajectory and acquire a natural image by minimizing a time gap between the pixel reset and the pixel readout.

Figure 7A:
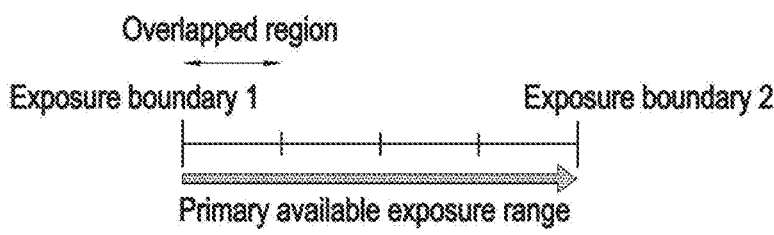
FIG. 7A illustrates an overlapping time range for setting a first exposure time or a second exposure time of the image sensor according to an embodiment of the disclosure.

FIG. 7A illustrates an overlapping time range for setting a first exposure time or a second exposure time of the image sensor according to an embodiment of the disclosure. FIG. 7B illustrates a non-overlapping time range for setting a first exposure time or a second exposure time of the image sensor according to an embodiment of the disclosure.

As an embodiment, an electronic device (for example, the exposure/fps calculator 243 of FIG. 2A) may receive not only an output image of the image sensor but also the motion map and a glare degree (for example, the result of the light core estimator) of the light source described below as an input. The electronic device may calculate the first exposure time for acquiring a trajectory image of the subject included in the motion area and the second exposure time for acquiring a still image for the stop area. The electronic device may set the first exposure time in real time to correspond to the motion area on the basis of the motion map updated in real time and set the second exposure time to correspond to the stop area on the basis of the acquired motion map of an image frame ($N-1^{th}$ frame) right before a final image frame ($N^{th}$ frame).

As an embodiment, the electronic device may set the first exposure time on the basis of whether supersaturation by exposure to the motion area is generated or the resolution of the motion area. For example, the electronic device may set the first exposure time within a range in which the resolution of the motion area is larger than or equal to a preset reference and supersaturation is not generated. The resolution may be a distance between two points optical instruments can iden-tify, and as an embodiment, the electronic device may set the first exposure time to make the result of analysis of the image according to frequency analysis become a preset optimum level.

As an embodiment, the electronic device may set the first exposure time on the basis of glare of the light source included in the motion area. The electronic device may set an exposure time for clearly viewing the shape of the light source and an exposure time range of a glare degree suitable for synthesis of image frames on the basis of the glare degree (for example, the result of the light core estimator described below) according to the exposure time of the light source included in the image frame, and may set the first exposure time by combining a predetermined range limit therewith.

As an embodiment, the electronic device may set the first exposure time on the basis of a first time range configured on the basis of whether supersaturation by exposure to the motion area is generated or the resolution of the motion area and a second time range configured on the basis of glare of the light source included in the motion area.

As an embodiment, when the first time range and the second time range overlap as illustrated in FIG. 7A, the electronic device may set the first exposure time within an overlapping region (exposure boundary 1 to exposure boundary 4).

As an embodiment, when the first time range and the second time range do not overlap as illustrated in FIG. 7B, the electronic device may set the first exposure time as a value (exposure boundary 4) closest to the first time range within the second time range since the expression of the light trajectory has the top priority to capture a night road condition in an environment in which it is evening and there are strong car lights. As an embodiment, when there are only a few light resources such as a night country road, the first exposure time may be configured as a value (exposure boundary 1) closest to the second time range within the first time range in order to properly express the subject.

As an embodiment, the electronic device may compare the exposure time and a preset fps and may control the fps when it is determined that the light trajectory discontinuity (for example, the time gap) is generated according to reduction in the exposure time. As an embodiment, the electronic device may automatically control the fps by controlling pixel reset and pixel readout timing in the proxy mode.

As an embodiment, the electronic device may set the second exposure time on the basis of the resolution of the stop area. The electronic device may set the second exposure time within a range in which the resolution of the stop area is larger than or equal to a preset reference.

As an embodiment, the electronic device may set the second exposure time by applying a preset available range to the first exposure time. The electronic device may set the second exposure time by combining an average of the first exposure time for the motion area and the preset available range.

As an embodiment, the electronic device may set a third time range on the basis of the resolution of the stop area, set a fourth time range obtained by applying the preset available range to the first exposure time for the motion area, and set the second exposure time on the basis of the configured third time range and fourth time range.

As an embodiment, when the third time range is configured on the basis of the resolution of the stop area and the fourth time range is configured through a combination of the average of the first exposure time for the motion area and the preset available range overlap as illustrated in FIG. 7A, the electronic device may set the second exposure time in an overlapping region (exposure boundary 1 to exposure boundary 4).

As an embodiment, when the third time range and the fourth time range do not overlap as illustrated in FIG. 7B, the electronic device may set the second exposure time as a value (exposure boundary 1) closest to the fourth time range within the third time range since the resolution of the stop area has the top priority to capture a night road condition in an environment in which it is evening and there are strong car lights. As an embodiment, when there are only a few light resources such as a night country road, the second exposure time may be configured as a value (exposure boundary 4) closest to the third time range within the fourth time range in order to reduce mismatch with the motion area.

As an embodiment, when the user receives an input related to the exposure time of the motion area or the stop area on-demand, the electronic device may put the top priority on the on-demand input of the user and set the first exposure time or the second exposure time.

Figure 8:
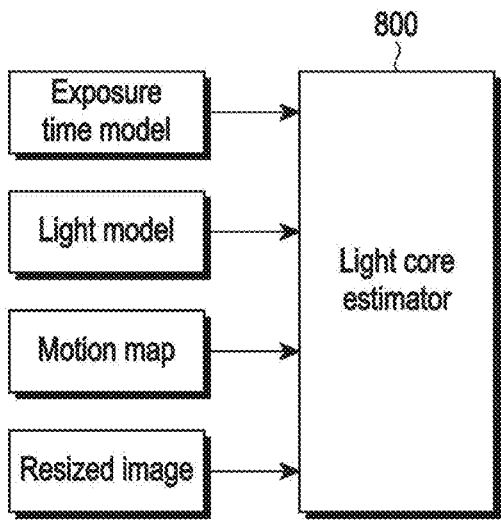
FIG. 8 is a block diagram of a light core estimator according to an embodiment of the disclosure.
Figure 9:
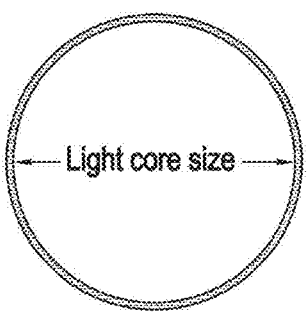
FIG. 9 is a diagram schematically illustrating a glare degree based on each exposure time according to an embodiment of the disclosure.
Figure 9:
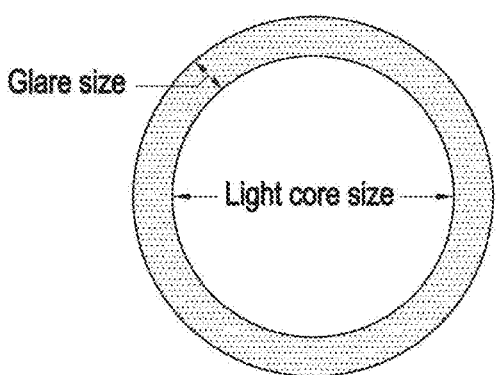
Figure 9:
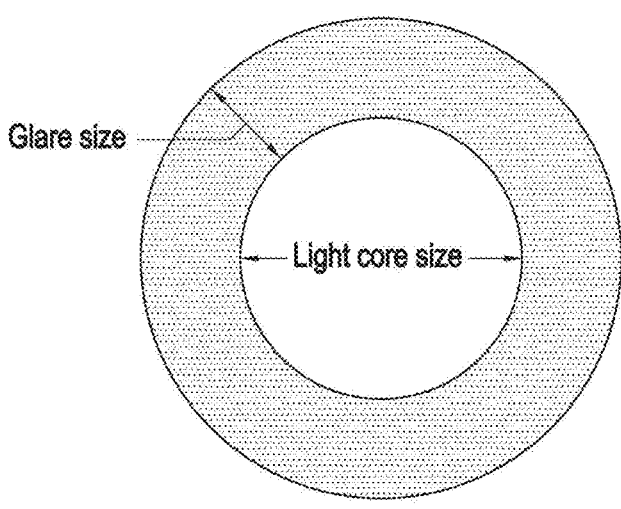

FIG. 8 is a block diagram of a light core estimator 800 according to an embodiment of the disclosure. FIG. 9 is a diagram schematically illustrating a glare degree based on each exposure time according to an embodiment of the disclosure.

Referring to FIGS. 8 to 9, the light core estimator (for example, the light core estimator 244 of FIG. 2A) may predict the glare degree according to the exposure time of the image frame.

When a light trajectory is captured, the exposure time of the image frame acquired by the image sensor may influence the shape of the glare. When the light trajectory is captured, exposure for a relatively short time has little glare and thus the shape of the light source may be clearly expressed and the color of the light source may be maintained, but when image frames are synthesized, a final light trajectory may be too clearly expressed and thus naturalness may be reduced. On the other hand, exposure for a relatively long time makes smooth synthesis but light saturation for the light source may be generated, and thus the color may disappear or a plurality of light trajectories are bound and it may be difficult to separate them. Accordingly, it may be important to calculate the size of light sources in the image frames acquired by the image sensor and the exposure time for naturally expressing the corresponding light sources.

As an embodiment, the light core estimator 800 may receive an input of an exposure time model, a light model, a motion map, and/or a resized image and output three or more exposure times. The light core estimator 800 according to an embodiment may receive an input of the motion area of the image frame based on the motion map and calculate the size of light sources and the exposure time suitable for each light source.

For example, the exposure time model is a model for calculating an amount of light to be output from the pixel included in the image sensor according to the exposure time and may be a model preset in the image sensor. Further, the light model is a model for calculating glare of the light source varying depending on an image pattern of the light source and the control of brightness of the input image, which may be a model configured on the basis of the image frame acquired from the image sensor.

As an embodiment, the light core estimator 800 may predict glare according to the exposure time as well as the location and the size of the general light source. For example, the light core estimator 800 may predict the exposure time for making glare suitable for long-exposure synthesis for the motion area of the image frame. If there are a plurality of light sources in the image frame, the light core estimator 800 may output the location (coordinate) and the size only for the light source which satisfies a predetermined condition based on the brightness and the size of the light source and, accordingly, reduce calculation load.

Figure 7A:
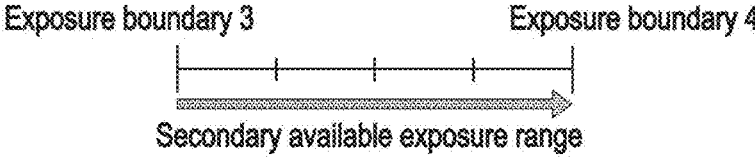
Figure 7B:
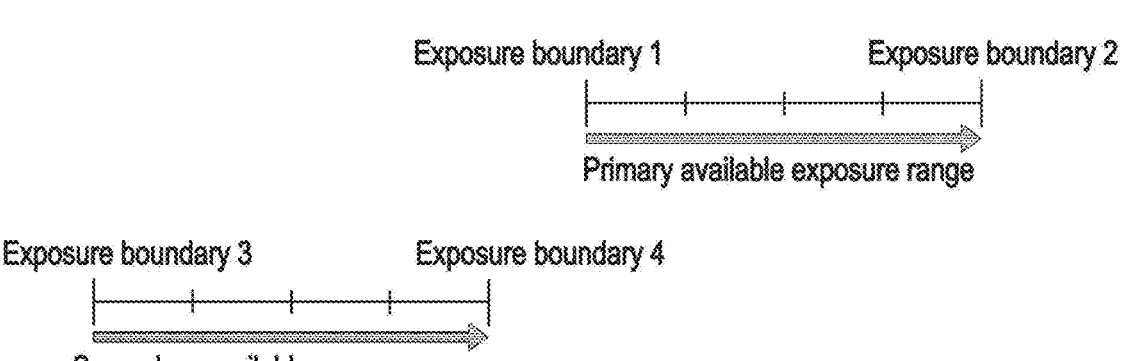
FIG. 7B illustrates a non-overlapping time range for setting a first exposure time or a second exposure time of the image sensor according to an embodiment of the disclosure.

As an embodiment, the light core estimator 800 may output a minimum of three or more exposure times (exposure times 1, 2, and 3) and output the exposure time (exposure time 1) at which there is little glare of light sources on average, the exposure time (exposure time 2) at which an average value of glare of the light sources corresponds to a predetermined minimum value, and the exposure time (exposure time 3) at which the average value of glare of the light sources correspond to a predetermined maximum value as illustrated in FIGS. 7 to 8. The glare degree may be the size (radius size) of glare generated from the light source, and the exposure times (exposure times 1, 2, and 3) output by the light core estimator 800 may be used to calculate the exposure time of the exposure/fps calculator (for example, the exposure/fps calculator 243 of FIG. 2A).

Figure 10:
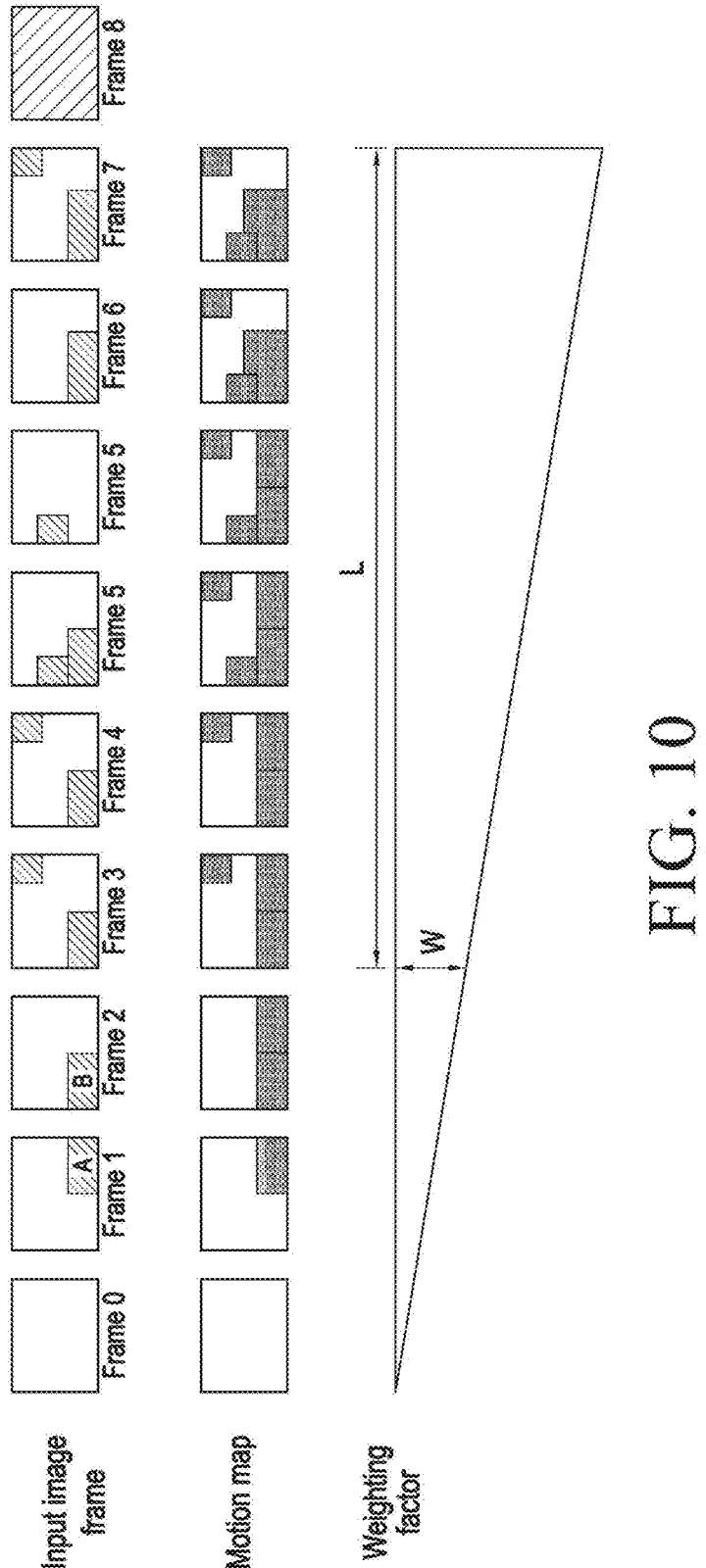
FIG. 10 illustrates a process of generating a motion map according to an embodiment of the disclosure.
Figure 11:
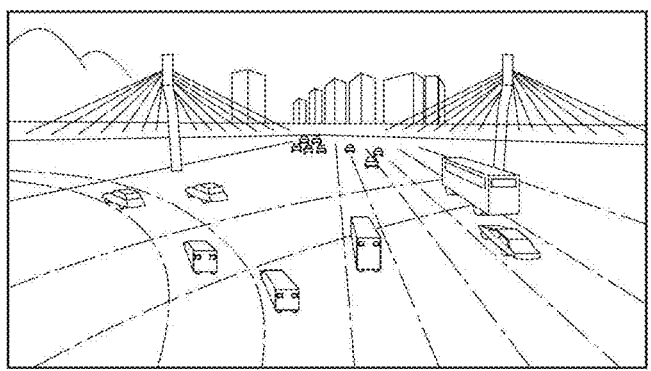
FIG. 11 illustrates an example of a motion map based on an image frame according to an embodiment of the disclosure.
Figure 11:

FIG. 10 illustrates a process of generating a motion map according to an embodiment of the disclosure. FIG. 11 illustrates an example of a motion map based on an image frame according to an embodiment of the disclosure.

Referring to FIGS. 10 to 11, the electronic device (for example, the ISP 241 of FIG. 2A) according to an embodiment may receive an input of an image frame output from the image sensor.

As an embodiment, the electronic device (for example, the motion map generator 245 of FIG. 2A) may generate a motion map displaying a region in which motion of a subject included in the image frame output from the image sensor exists. As an embodiment, the electronic device may display a motion area and/or a stop area in the motion map.

As an embodiment, the electronic device may generate an initial motion map by using two frames (frame 0 and frame 1) initially acquired from the image sensor. The electronic device may accumulate continuously acquired image frames and update in real time the motion map.

As an embodiment, when the subject (or pixel) moves by a preset distance or more or in a particular direction in successive image frames among a plurality of image frames acquired from the image sensor, the electronic device may identify an area corresponding to the subject as the motion area. As an embodiment, the electronic device may detect, as the motion area, an area of the subject having moved with directivity by a preset distance or more in two successive image frames and identify, as the motion area, an area of the subject having moved in a specific direction or by a preset distance or more in a predetermined number or more of successive image frames.

As an embodiment, the electronic device identifies the motion area by detecting a motion of the subject, but may except areas in which there is no motion of the subject as a predetermined time passes or in a predetermined number or more of image frames or identify the areas as the motion areas.

For example, as illustrated in FIG. 9, the electronic device may display a region A including motion in frame 1 as the motion area in the motion map, but there is no more motion thereafter and thus may exclude the region A from the motion area in frame 6 and display the region A as the stop area. Further, the electronic device may determine whether to exclude a region B including motion in frame 2 from the motion area but there is motion after frame 3 and thus may maintain the region B as the motion area.

As an embodiment, the electronic device may update the motion map in real time on the basis of some image frames recently acquired among a plurality of image frames acquired from the image sensor. As an embodiment, the motion map may display the motion area in white and display the stop area in black as illustrated in FIG. 10.

As an embodiment, when generating the motion map, the electronic device may determine whether user hand-shaking is larger than a predetermined level by analyzing motion in the motion area. When motion having a predetermined size or more is generated in all image frames, the electronic device may determine it as motion by user hand-shaking. When the hand-shaking continues for a predetermined time or in predetermined image frames or more, the electronic device may display the corresponding message to the user and stop acquiring a long-exposure image. This is because the quality of the final image may deteriorate when the user hand-shaking is excessive. The user hand-shaking generated in successive image frames may cause a problem in image synthesis. The hand-shaking is not a big problem in the motion area, but the user does not want the user hand-shaking by synthesizing image frames and deterioration of clarity according thereto in the stop area in which the user expects high clarity.

As an embodiment, the electronic device (for example, the image blender 246 of FIG. 2A) may synthesize a plurality of image frames input from the image sensor on the basis of the motion map updated in real time. As an embodiment, the electronic device may acquire a plurality of first image frames corresponding to the first exposure time from the image sensor and synthesize in real time and output the plurality of acquired first image frames. Finally, the electronic device may generate a first image for acquiring an image for the motion area on the basis of the final motion map and N−2 image frames.

As an embodiment, the electronic device may synthesize a plurality of image frames by applying a weighting factor (W) according to a pre-stored condition. As an embodiment, the electronic device may apply a relatively larger weighting factor (W) to an image frame acquired at a time point adjacent to a time point at which the final image is generated and apply gradually smaller weighting factors (W) as time gaps are larger. Accordingly, in consideration of a weighting factor (W) applied to the final image obtained by synthesizing the plurality of image frames, image frames of a section L may be a significant section in the final image.

As an embodiment, when the number of light sources within the motion area is fixed to a specific range, image frames may be synthesized through the following method if a weighting factor for a new image frame is preset as 0.65.

Blended Image1 = Frame0 ∗ 0.35 + Frame1 ∗ 0.65

Blended Image2 = Blended Image1 ∗ 0.35 + Frame2 ∗ 0.65

Blended Image3 = Blended Image2 ∗ 0.35 + Frame2 ∗ 0.65

As an embodiment, the electronic device may change and apply the weighting factor (W) on the basis of the number of light sources within the motion area. For example, when the number of light sources within the motion area is large, the electronic device may increase the difference between weighting factors applied for synthesis of the conventional image frame and the new image frame. This is to reduce monotonousness of the image and color saturation due to many light sources. On the other hand, when the number of light sources within the motion area is small, the electronic device may decrease the difference between weighting factors applied for synthesis of the conventional image frame and the new image frame. For example, when the number of light sources within the motion area is 1, it is possible to minimize the difference between weighting factors applied for synthesis of the conventional image frame and the new image frame, thereby expressing well the light trajectory of the light source.

The motion map may also be generated on the basis of influence by the weighting factor (W). When motion exists only in an image frame having a large time gap from the final image, this means a meaningless image since the light trajectory is blurred in the final image, and thus the electronic device may synthesize the corresponding region as the stop area in order to obtain a better quality.

As an embodiment, the electronic device (for example, the region matching blender 247 of FIG. 2A) may acquire an image from a source for each of the motion area and the stop area on the basis of the motion map and synthesize the images in order to improve the clarity of the stop area. The electronic device may generate a synthesized image obtained by synthesizing the first image for the motion area and the second image for the stop area on the basis of the final motion map. As an embodiment, the electronic device may acquire a part corresponding to the motion area in the first image output from the image blender (for example, the image blender 246 of FIG. 2A) and acquire a part corresponding to the stop area in the second image corresponding to the image frame captured on the basis of the exposure time for capturing the stop area. As an embodiment, the electronic device may acquire a motion area and a stop area larger than the motion area and the stop area identified in the motion map (for example, the final motion map) generated from the first image and the second image and synthesize the synthesized image by storing the same in two layers, respectively.

Figure 12:
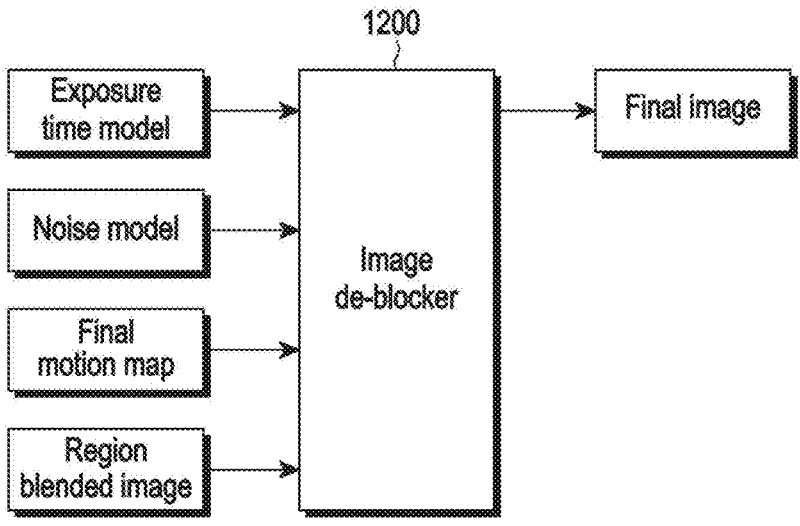
FIG. 12 is a block diagram of an image de-blocker according to an embodiment of the disclosure.

FIG. 12 is a block diagram of an image de-blocker 1200 according to an embodiment of the disclosure.

Referring to FIG. 12, the image de-blocker 1200 (for example, the image de-blocker 248 of FIG. 2A) according to an embodiment may remove the difference of the boundary between the motion area and the stop area of the synthesized image output from the region matching blender (for example, the region matching blender 247 of FIG. 2A). The difference of the boundary may be generated by continuous motion of the user or an error of the motion map.

The image de-blocker 1200 according to an embodiment may apply de-blocking processing to the boundary between the motion area and the stop area of the synthesized image. The image de-blocker 1200 may receive an input of an exposure time model, a noise model, a final motion map, and a region blended image and output the final image.

The de-blocking processing may apply various algorithms according to an intensity of motion, exposure, a capturing time, and noise of the image. For example, the de-blocking processing may include a function of similarly applying a noise level (noise model) and a brightness level (exposure time model) to all of the stop areas and the motion areas in order to maintain uniformness between all image frames. Further, the stop area may have relatively excessive noise compared to the motion area, and thus a method of adding a predetermined level of noise to the motion area may be used when it is difficult to remove noise from the stop area. The electronic device may generate the final image by synthesizing images having finished boundary processing and noise/brightness processing into one layer.

Figure 13:
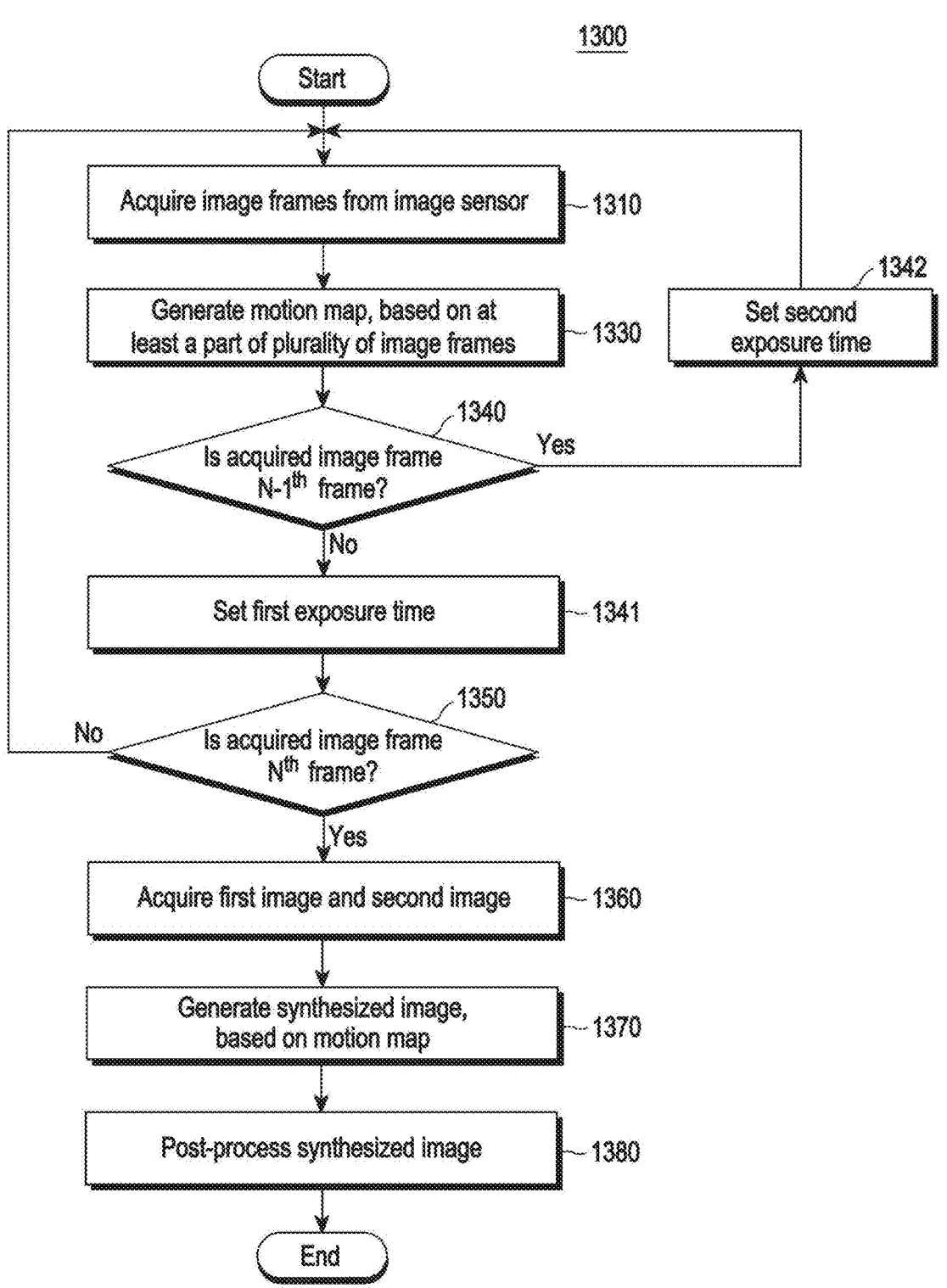
FIG. 13 is a flowchart illustrating a method of operating the electronic device according to a first embodiment of the disclosure.

FIG. 13 is a flowchart illustrating a method 1300 of operating the electronic device according to a first embodiment of the disclosure.

Referring to FIG. 13, the method of operating the electronic device according to the first embodiment of the disclosure may capture a second image for the stop area after capturing and synthesis of first images for the motion area are initially completed. As described above, when the second image for the stop area is captured later, the image of the stop area corresponding to the later parts of long-exposure capturing may be captured.

The electronic device according to an embodiment may acquire image frames from the image sensor in operation 1310. When capturing images, the electronic device may sequentially acquire a plurality of image frames, and the number (N) of acquired image frames may be preset.

The electronic device according to an embodiment may acquire image frames on the basis of a first exposure time or a second exposure time configured thereafter and acquire image frame on the basis of an amount of light incident to the image sensor, a preset exposure time, or a fps before the configuration of the first exposure time or the second exposure time (for example, initially).

The electronic device according to an embodiment may generate a motion map on the basis of at least one some of the plurality of image frames in operation 1330. The electronic device may initially generate the motion map on the basis of initially acquired two image frames (frame 0 and frame 1) and update the motion map on the basis of image frames sequentially acquired thereafter. The electronic device may generate the motion map on the basis of a preset number or less of image frames among the plurality of acquired image frames.

The electronic device according to an embodiment may identify whether the acquired image frame is an N–$1^{th}$ frame in operation 1340.

When the acquired image frame is not the N–$1^{th}$ image frame, the electronic device according to an embodiment may set a first exposure time for a region identified as the motion area on the basis of the motion map in operation 1341.

When the acquired image frame is the N–$1^{th}$ image frame, the electronic device according to an embodiment may set a second exposure time for a region identified as the stop area on the basis of the motion map in operation 1342.

The electronic device according to an embodiment may identify whether the acquired image frame is an $N^{th}$ image frame in operation 1350 and, when the acquired image frame is not the $N^{th}$ frame, repeatedly acquire image frames.

When the acquired image frame is the $N^{th}$ frame, the electronic device according to an embodiment may acquire a first image and a second image on the basis of the plurality of image frames in operation 1360. For example, the electronic device may acquire the first image by synthesizing N–2 image frames (frame 2, . . . , frame N–1) corresponding to the first exposure time and acquire an image frame (frame N) corresponding to the second exposure time as the second image.

The electronic device according to an embodiment may generate a synthesized image obtained by synthesizing the first image and the second image on the basis of the finally updated motion map in operation 1370.

The electronic device according to an embodiment may generate the final image by applying post-processing to the generated synthesized image in operation 1380. As an embodiment, the electronic device may apply de-blocking processing to the synthesized image.

Figure 14:
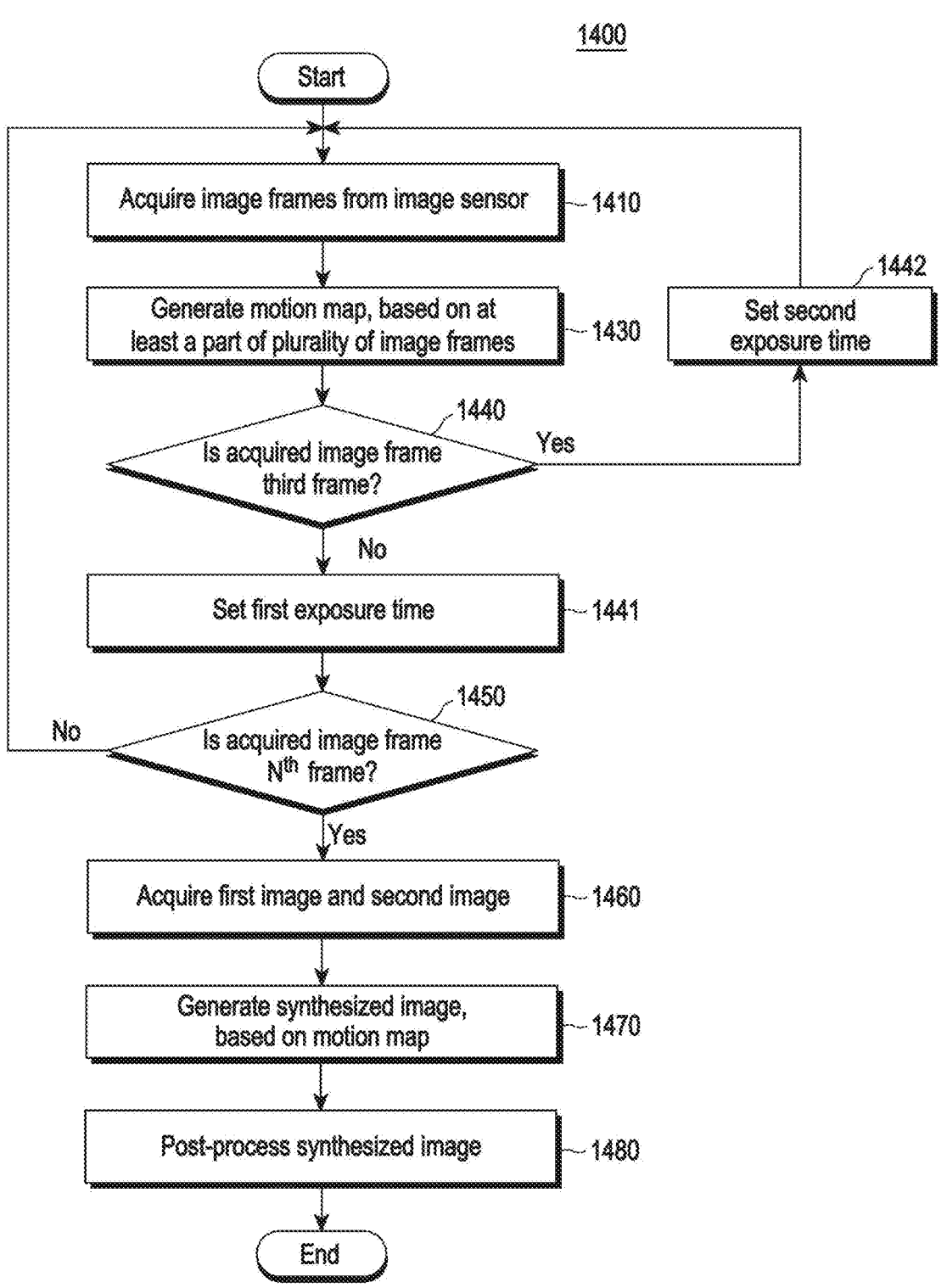
FIG. 14 is a flowchart illustrating a method of operating the electronic device according to a second embodiment of the disclosure.

FIG. 14 is a flowchart illustrating a method 1400 of operating the electronic device according to a second embodiment of the disclosure.

Referring to FIG. 14, the method of operating the electronic device according to the second embodiment of the disclosure may initially capture s second image for the stop area and then capture and synthesize first images for the motion area. As described above, when the second images for the stop area are captured in advance, an image of the stop area corresponding to the beginning parts of long-exposure capturing may be captured.

The electronic device according to an embodiment may acquire image frames from the image sensor in operation 1410.

The electronic device according to an embodiment may generate a motion map on the basis of at least one some of the plurality of image frames in operation 1430. As an embodiment, the electronic device may generate the motion map on the basis of initially acquired two image frames (frame 0 and frame 1).

The electronic device according to an embodiment may identify whether the acquired image frame is a third frame (frame 2) in operation 1440.

When the acquired image frame is not the third frame, the electronic device according to an embodiment may set a first exposure time for a region identified as the motion area on the basis of the motion map in operation 1441.

When the acquired image frame is the third frame, the electronic device according to an embodiment may set a second exposure time for a region identified as the stop area on the basis of the motion map in operation 1442.

The electronic device according to an embodiment may identify whether the acquired image frame is an $N^{th}$ image frame in operation 1450 and, when the acquired image frame is not the $N^{th}$ frame, repeatedly acquire image frames.

When the acquired image frame is the $N^{th}$ frame, the electronic device according to an embodiment may acquire a first image and a second image on the basis of the plurality of image frames in operation 1460. For example, the electronic device may acquire the first image by synthesizing N−2 image frames (frame 3, frame 4, . . . , frame N) corresponding to the first exposure time and acquire an image frame (frame 2) corresponding to the second exposure time as the second image.

The electronic device according to an embodiment may generate a synthesized image obtained by synthesizing the first images and the second image on the basis of the finally updated motion map in operation 1470.

The electronic device according to an embodiment may generate the final image by applying post-processing to the generated synthesized image in operation 1480. As an embodiment, the electronic device may apply de-blocking processing to the synthesized image.

Figure 15:
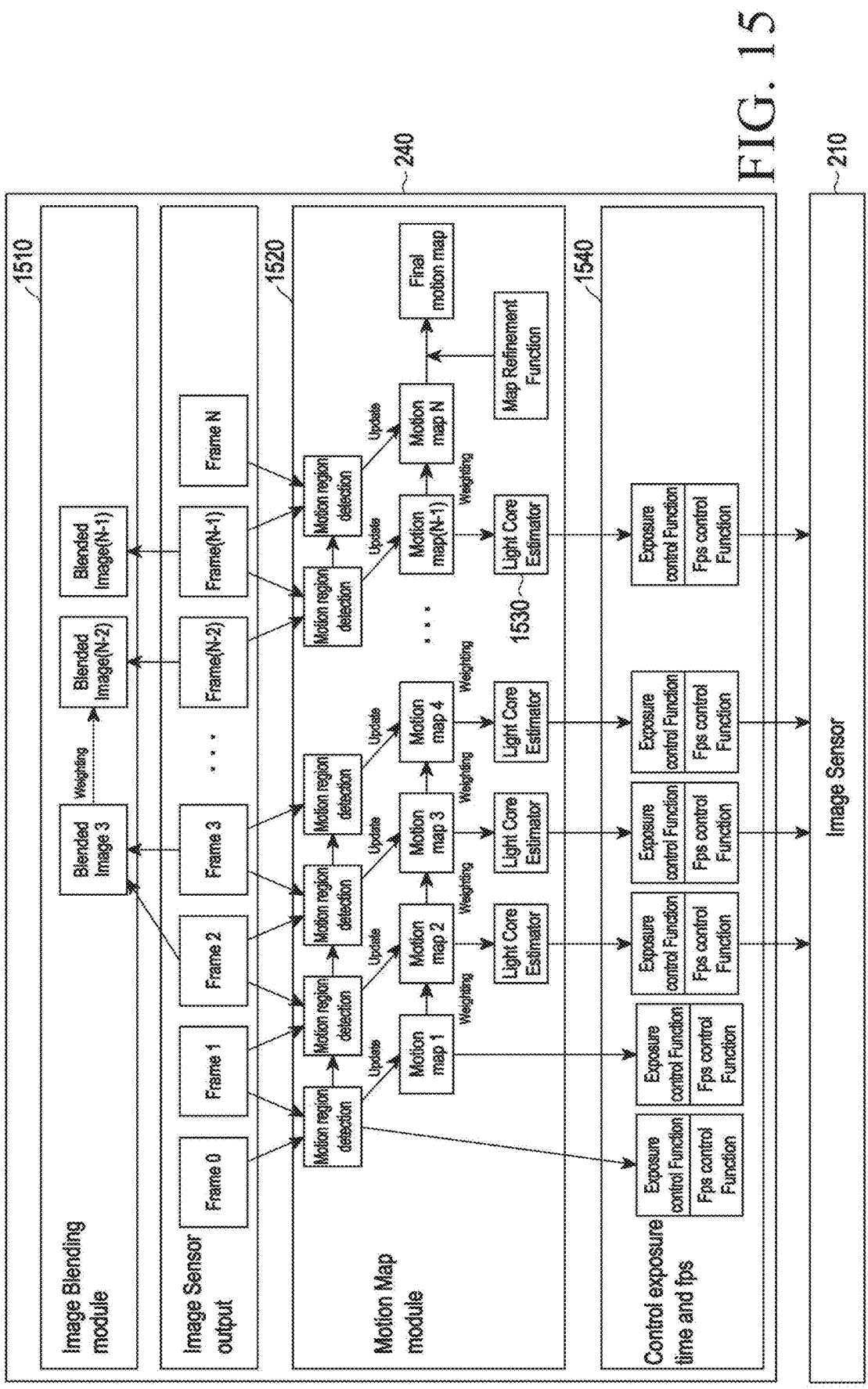
FIG. 15 is a signal flowchart illustrating a real-time operation for long-exposure capturing of the electronic device according to an embodiment of the disclosure.
Figure 16:
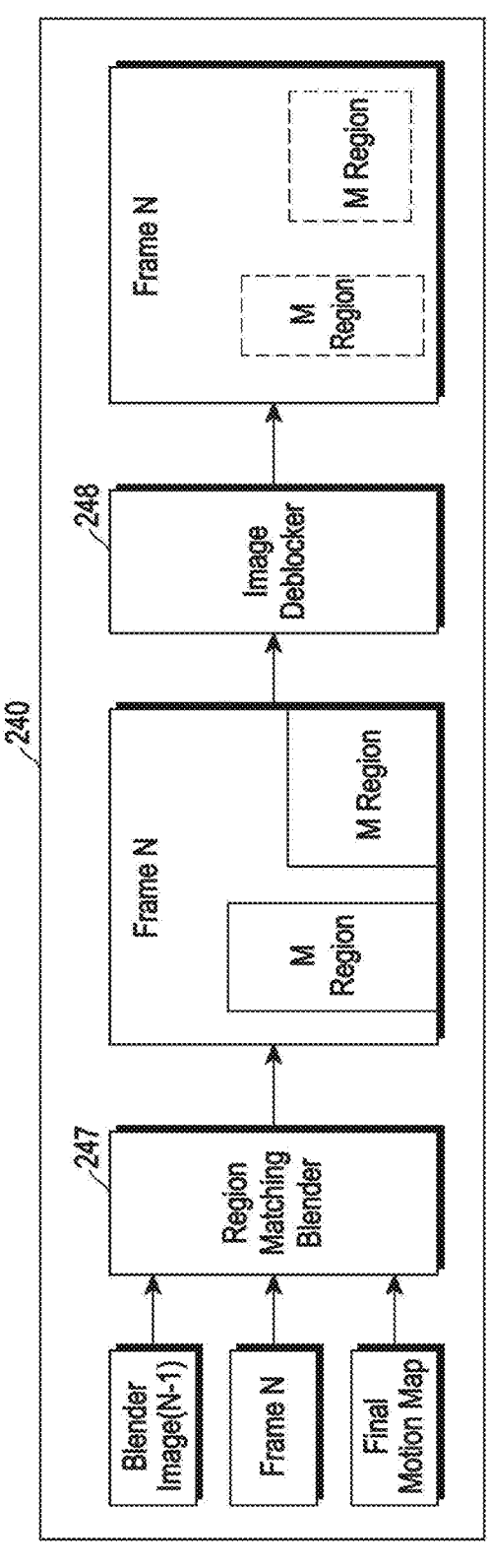
FIG. 16 is a signal flowchart illustrating a non-real-time operation for long-exposure capturing of the electronic device according to an embodiment of the disclosure.

FIG. 15 is a signal flowchart illustrating a real-time operation for long-exposure capturing of the electronic device according to an embodiment of the disclosure. FIG. 16 is a signal flowchart illustrating a non-real-time operation for long-exposure capturing of the electronic device according to an embodiment of the disclosure.

Referring to FIG. 15, the processor 240 according to an embodiment of the disclosure may receive an input for long-exposure capturing or determine a condition for long-exposure capturing. The processor 240 may operate the image sensor 210 to sequentially acquire a preset number of image frames and acquire image frames output from the image sensor 210.

As an embodiment, the electronic device may perform the non-real-time operation on the basis of data acquired by the real-time operation after performing the real-time operation, but a separate device receiving data acquired by the real-time operation may perform the non-real-time operation.

The image sensor 210 according to an embodiment may capture a minimum of two or more image frames (frame 0 and frame 1) according to a normal exposure time, and a motion map generation module 1520 may generate motion map 1 on the basis of motion of the subject included in the acquired two image frames. A light core estimator 1530 may estimate the core size of the light source located in the motion area according to motion map 1 and the exposure time according to proper glare required for synthesis and transmit the same to an exposure time and fps control module 1540 along with motion map 1. The exposure time and fps control module 1540 may calculate a first exposure time and/or a first fps on the basis of an exposure time corresponding to all frames calculated by the conventional scheme, a recommended exposure time of motion map 1 and the light core estimator, and an exposure time corresponding to the stop area calculated therein, and control the image sensor 210 according thereto.

In frame 2 input continuously thereafter, the exposure time and fps control module 1540 according to an embodiment may control the exposure time and the fps on the basis of the motion area according to the motion map equally up to frame (N−1). The motion map may be updated by accumulating motion between respective image frames. The motion map generation module 1520 may apply a weighting factor according to the generation frequency and time of motion for each motion determination unit (for example, pixel or specific size) in order to accurately determine the motion area changed in each image frame.

An image blending module 1510 according to an embodiment may synthesize image frames while the image frames according to the exposure time corresponding to the motion area are input. The image blending module 1510 may continuously perform synthesis through an accumulation scheme of adding a new image frame to the conventional synthesized image. The image blending module 1510 may synthesize the conventional synthesized image and the newly acquired image frame by applying weighting factors according to a capturing environment.

When the image frames reach an N−1$^{th}$ frame by a capturing stop input of the user, automatic stop due to detection of motion of the subject, or acquisition of a predetermined number of image frames, the exposure time and fps control module 1540 according to an embodiment may control the image sensor by setting a second exposure time and/or a second fps to more clearly express (balance with clarity, color, and motion area) the subject in the stop area, and accordingly, the image sensor may acquire and output frame N. After generating motion map N reflecting final frame N, the motion map generation module 1520 may remove high-frequency components of the motion area and the stop area from the motion map and perform map refinement of making the boundary between respective regions smooth, so as to generate the final motion map. Accordingly, the real-time operation of long-exposure capturing may be completed.

As an embodiment, the processor 240 may display blended image N−1 of the image blending module 1510 on the display in order to rapidly display the capturing result before the non-real-time operation described below is completed.

Referring to FIG. 16, the processor 240 according to an embodiment of the disclosure may enter the non-real-time operation of long-exposure capturing. The processor 240 may generate the final image on the basis of blended image N−1, frame N, and the final motion map which are the result of the real-time operation of long-exposure capturing.

As an embodiment, the region matching blender 247 may acquire a region corresponding to the motion area in blended image N−1 and a region corresponding to the stop area in frame N on the basis of the final motion map. The region matching blender may apply preprocessing to exposure, sharpen, and color for each region in order to naturally synthesize the stop area and the motion area.

As an embodiment, the image de-blocker 248 may generate the final image by processing a boundary part between respective areas in order to naturally synthesize the stop area and the motion area.

According to an electronic device and a method of operating the same according to an embodiment of the disclosure, it is possible to prevent light saturation of the trajectory of the light source even though an exposure time is not configured in accordance with brightness of one or more light sources included in an image. Further, it is possible to properly acquire the resolution and color of the subject for the stop area and minimize hand-shaking for the stop area by separately acquiring images according to the exposure time suitable for the stop area in the beginning parts or the later parts.

Figure 17A:
FIG. 17A illustrates the result according to a real-time operation for long-exposure capturing of the electronic device according to an embodiment of the disclosure.
Figure 17B:
FIG. 17B illustrates the result according to a real-time operation and a non-real-time operation for long-exposure capturing of the electronic device according to an embodiment of the disclosure.

FIG. 17A illustrates the result according to a real-time operation for long-exposure capturing of the electronic device according to an embodiment of the disclosure. FIG. 17B illustrates the result according to the real-time operation and a non-real-time operation for long-exposure capturing of the electronic device according to an embodiment of the disclosure.

Referring to FIGS. 17A to 17B, it may be noted that the light trajectory for the motion area included in the image is naturally expressed in the result of long-exposure capturing of the electronic device according to an embodiment. However, as illustrated in FIG. 17A, as image frames are acquired and synthesized on the basis of the exposure time corresponding to the motion area, hand-shaking is reflected in the stop area and clarity deteriorates.

As illustrated in FIG. 17B, an image frame is acquired on the basis of a separate exposure time corresponding to the stop area included in the image in the result according to the real-time operation and the non-real-time operation for long-exposure capturing of the electronic device according to an embodiment. Accordingly, the exposure time is appropriately applied to correspond to brightness of the stop area and hand-shaking is minimized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device 101, 200, 400 according to an embodiment of the disclosure may include an image sensor 210, 410 and at least one processor 120, 240, 420 operatively connected to the image sensor 210, 410. The at least one processor 120, 240, 420 may be configured to generate a motion map for identifying at least one region of a plurality of image frames as one of a stop area and a motion area, based on at least a part of the plurality of image frames acquired from the image sensor 210, 410. The at least one processor 120, 240, 420 may be configured to set a first exposure time corresponding to the motion area and a second exposure time corresponding to the stop area, based on the generated motion map. The at least one processor 120, 240, 420 may be configured to acquire a first image corresponding to the first exposure time and a second image corresponding to the second exposure time from the image sensor 210, 410. The at least one processor 120, 240, 420 may be configured to generate a synthesized image by synthesizing the acquired first image and second image, based on the motion map.

In the electronic device 101, 200, 400 according to an embodiment of the disclosure, the at least one processor 120, 240, 420 may be further configured to, as at least a part of the setting the first exposure time and the second exposure time, set the first exposure time, based on whether supersaturation by exposure to the motion area is generated or a resolution of the motion area.

In the electronic device 101, 200, 400 according to an embodiment of the disclosure, the at least one processor 120, 240, 420 may be further configured to, as at least a part of the setting the first exposure time and the second exposure time, set the first exposure time, based on glare of a light source included in the motion area.

In the electronic device 101, 200, 400 according to an embodiment of the disclosure, the at least one processor 120, 240, 420 may be further configured to, as at least a part of the setting the first exposure time and the second exposure time, set a first time range, based on whether supersaturation by exposure to the motion area is generated or a resolution of the motion area, set a second time range, based on glare of a light source included in the motion area, and set the first exposure time, based on the configured first time range and second time range.

In the electronic device 101, 200, 400 according to an embodiment of the disclosure, the at least one processor 120, 240, 420 may be further configured to, as at least a part of the setting the first exposure time and the second exposure time, set a third time range, based on a resolution of the stop area, set a fourth time range obtained by applying a preset available range to the first exposure time, and set the second exposure time, based on the configured third time range and fourth time range.

In the electronic device 101, 200, 400 according to an embodiment of the disclosure, the at least one processor 120, 240, 420 may be further configured to, as at least a part of the setting the first exposure time and the second exposure time, set the first exposure time or the second exposure time, based on the user input, in response to receiving the user input related to the first exposure time or the second exposure time is received.

In the electronic device 101, 200, 400 according to an embodiment of the disclosure, the at least one processor 120, 240, 420 may be further configured to, as at least a part of the acquiring the first image and the second image, acquire a plurality of first image frames corresponding to the first exposure time from the image sensor (210, 410) and acquire the first image by synthesizing the plurality of acquired first image frames.

In the electronic device 101, 200, 400 according to an embodiment of the disclosure, the at least one processor 120, 240, 420 may be further configured to, as at least a part of the acquiring the first image and the second image, acquire a single second image frame corresponding to the second exposure time as the second image from the image sensor (210, 410).

In the electronic device 101, 200, 400 according to an embodiment of the disclosure, the at least one processor 120, 240, 420 may be further configured to, as at least a part of the generating the motion map, identify an area corresponding to a subject as the motion area based on identifying that the subject moves by a preset distance or longer or in a specific direction between successive image frames among the plurality of image frames acquired from the image sensor.

In the electronic device 101, 200, 400 according to an embodiment of the disclosure, the at least one processor 120, 240, 420 may be further configured to, as at least a part of the generating the motion map, update the motion map in real time, based on a part of the plurality of image frames acquired from the image sensor (210, 410).

In the electronic device 101, 200, 400 according to an embodiment of the disclosure, the at least one processor 120, 240, 420 may be further configured to, as at least a part of the generating the synthesized image, synthesize the first image for the motion area and the second image for the stop area, based on the updated motion map.

A method of operating an electronic device 101, 200, 400 according to an embodiment of the disclosure may include generating a motion map for identifying at least one region of a plurality of image frames as one of a stop area and a motion area, based on at least a part of the plurality of image frames acquired from an image sensor 210, 410. The method may include setting a first exposure time corresponding to the motion area and a second exposure time corresponding to the stop area, based on the generated motion map. The method may include acquiring a first image corresponding to the first exposure time and a second image corresponding to the second exposure time from the image sensor 210, 410. The method may include generating a synthesized image by synthesizing the acquired first image and second image, based on the motion map.

In the method of operating the electronic device 101, 200, 400 according to an embodiment, the setting the first exposure time and the second exposure time may include setting a first time range, based on whether supersaturation by exposure to the motion area is generated or a resolution of the motion area, setting a second time range, based on glare of a light source included in the motion area, and setting the first exposure time, based on the configured first time range and second time range.

In the method of operating the electronic device 101, 200, 400 according to an embodiment, the setting the first exposure time and the second exposure time may include configuring set a third time range, based on a resolution of the stop area, setting a fourth time range obtained by applying a preset available range to the first exposure time, and setting the second exposure time, based on the configured third time range and fourth time range.

In the method of operating the electronic device 101, 200, 400 according to an embodiment, the acquiring the first image and the second image may include acquiring a plurality of first image frames corresponding to the first exposure time from the image sensor 210, 410 and acquire the first image by synthesizing the plurality of acquired first image frames, and acquiring a single second image frame corresponding to the second exposure time as the second image from the image sensor 210, 410

In the method of operating the electronic device 101, 200, 400 according to an embodiment, the generating the motion map may include updating the motion map in real time, based on a part of the plurality of image frames acquired from the image sensor 210, 410, and the generating the synthesized image may include synthesizing the first image for the motion area and the second image for the stop area, based on the updated motion map to generate the synthesized image.

An electronic device 101, 200, 400 according to an embodiment of the disclosure may include an image sensor 210, 410, and at least one processor 120, 240, 420 operatively connected to the image sensor 210, 410. The at least one processor 120, 240, 420 may be configured to set an exposure time of an image frame, based on an output image acquired from the image sensor 210, 410. The at least one processor 120, 240, 420 may be configured to set a readout cycle of the image frame to correspond to the configured exposure time. The at least one processor 120, 240, 420 may be configured to acquire the image frame according to the configured exposure time from the image sensor 210, 410, based on the configured readout cycle.

In the electronic device 101, 200, 400 according to an embodiment, the at least one processor 120, 240, 420 may be configured to, as at least a part of the setting the readout cycle of the image frame to correspond to the configured exposure time, set the readout cycle as a reciprocal number of the exposure time of the image frame such that a readout operation of a previous image frame corresponds to a reset operation of a following image frame among a plurality of successive image frames.

The electronic device 101, 200, 400 according to an embodiment may further include a signal line connecting the image sensor 210, 410 and the at least one processor 120, 240, 420, and the at least one processor 120, 240, 420 may be configured to transmit a control signal of the reset operation of the image frame or the readout operation of the image frame to the image sensor 210, 410 through the signal line.

In electronic device 101, 200, 400 according to an embodiment, the at least one processor 120, 240, 420 may be configured to, as at least a part of the setting the exposure time of the image frame, generate a motion map for identifying at least one region of the output image as one of a stop area and a motion area, based on the output image acquired from the image sensor 210, 410, and set a first exposure time corresponding to the motion area and a second exposure time corresponding to the stop area, based on the generated motion map.

A non-transitory computer-readable storage medium storing one or more programs according to an embodiment of the disclosure may include generating a motion map for identifying at least one region of a plurality of image frames as one of a stop area and a motion area, based on at least a part of the plurality of image frames acquired from an image sensor 210, 410, based on execution of an application. The storage medium may include setting a first exposure time corresponding to the motion area and a second exposure time corresponding to the stop area, based on the generated motion map. The storage medium may include acquiring a first image corresponding to the first exposure time and a second image corresponding to the second exposure time from the image sensor 210, 410. The storage medium may include generating a synthesized image by synthesizing the acquired first image and second image, based on the motion map.

The invention claimed is:

1. An electronic device comprising:
an image sensor; and
at least one processor operatively connected to the image sensor,
wherein the at least one processor is configured to:
generate a motion map for identifying at least one region of a plurality of image frames as one of a stop area and a motion area, based on at least a part of the plurality of image frames acquired from the image sensor;
set a first exposure time corresponding to the motion area, which is identified by the generated motion map and a second exposure time corresponding to the stop area, which is identified by the generated motion map;
acquire a first image corresponding to the first exposure time and a second image corresponding to the second exposure time from the image sensor; and
generate a synthesized image by synthesizing the acquired first image and second image, based on the motion area and the stop area identified by the generated motion map.

2. The electronic device of claim 1, wherein the at least one processor is further configured to, as at least a part of the setting the first exposure time and the second exposure time, set the first exposure time, based on whether supersaturation by exposure to the motion area is generated or a resolution of the motion area.

3. The electronic device of claim 1, wherein the at least one processor is further configured to, as at least a part of the setting the first exposure time and the second exposure time, set the first exposure time, based on glare of a light source included in the motion area.

4. The electronic device of claim 1, wherein the at least one processor is further configured to, as at least a part of the setting the first exposure time and the second exposure time, set a first time range, based on whether supersaturation by exposure to the motion area is generated or a resolution of the motion area, set a second time range, based on glare of a light source included in the motion area, and set the first exposure time, based on the configured first time range and second time range.

5. The electronic device of claim 1, wherein the at least one processor is further configured to, as at least a part of the setting the first exposure time and the second exposure time, set a third time range, based on a resolution of the stop area, set a fourth time range obtained by applying a preset available range to the first exposure time, and set the second exposure time, based on the configured third time range and fourth time range.

6. The electronic device of claim 1, wherein, the at least one processor is further configured to, as at least a part of the setting the first exposure time and the second exposure time, set the first exposure time or the second exposure time, based on a user input, in response to receiving the user input related to the first exposure time or the second exposure time is received.

7. The electronic device of claim 1, wherein the at least one processor is further configured to, as at least a part of the acquiring the first image and the second image, acquire a plurality of first image frames corresponding to the first exposure time from the image sensor and acquire the first image by synthesizing the plurality of acquired first image frames.

8. The electronic device of claim 7, wherein the at least one processor is further configured to, as at least a part of the acquiring the first image and the second image, acquire a single second image frame corresponding to the second exposure time as the second image from the image sensor.

9. The electronic device of claim 1, wherein, the at least one processor is further configured to, as at least a part of the generating the motion map, identify an area corresponding to a subject as the motion area based on identifying that the subject moves by a preset distance or longer or in a specific direction between successive image frames among the plurality of image frames acquired from the image sensor.

10. The electronic device of claim 1, wherein the at least one processor is further configured to, as at least a part of the generating the motion map, update the motion map in real time, based on a part of the plurality of image frames acquired from the image sensor.

11. The electronic device of claim 10, wherein the at least one processor is further configured to, as at least a part of the generating the synthesized image synthesize the first image for the motion area and the second image for the stop area based on the updated motion map.

12. A method of operating an electronic device, the method comprising:

generating a motion map for identifying at least one region of a plurality of image frames as one of a stop area and a motion area, based on at least a part of the plurality of image frames acquired from an image sensor;

setting a first exposure time corresponding to the motion area, which is identified by the generated motion map and a second exposure time corresponding to the stop area, which is identified by the generated motion map;

acquiring a first image corresponding to the first exposure time and a second image corresponding to the second exposure time from the image sensor; and generating a synthesized image by synthesizing the acquired first image and second image, based on the motion area and the stop area identified by the generated motion map.

13. The method of claim 12, wherein the setting of the first exposure time and the second exposure time comprises setting a first time range, based on whether supersaturation by exposure to the motion area is generated or a resolution of the motion area, setting a second time range, based on glare of a light source included in the motion area, and setting the first exposure time, based on the configured first time range and second time range.

14. The method of claim 12, wherein the setting of the first exposure time and the second exposure time comprises setting a third time range, based on a resolution of the stop area, setting a fourth time range obtained by applying a preset available range to the first exposure time, and setting the second exposure time, based on the configured third time range and fourth time range.

15. The method of claim 12, wherein the acquiring of the first image and the second image comprises acquiring a plurality of first image frames corresponding to the first exposure time from the image sensor and acquiring the first image by synthesizing the plurality of acquired first image frames, and acquiring a single second image frame corresponding to the second exposure time as the second image from the image sensor.

16. The method of claim 12, wherein the generating of the motion map comprises updating the motion map in real time, based on a part of the plurality of image frames acquired from the image sensor, and the generating of the synthesized image comprises synthesizing the first image for the motion area and the second image for the stop area, based on the updated motion map to generate the synthesized image.

17. An electronic device comprising:

an image sensor; and at least one processor operatively connected to the image sensor, wherein the at least one processor is configured to:

generate a motion map for identifying at least one region of an output image as one of a stop area and a motion area, based on the output image acquired from the image sensor;

set an exposure time of an image frame, based on the motion area and the stop area identified by the generated motion map;

set a readout cycle of the image frame to correspond to the configured exposure time; and acquire the image frame according to the configured exposure time from the image sensor, based on the configured readout cycle.

18. The electronic device of claim 17, wherein the at least one processor is configured to, as at least a part of the setting the readout cycle of the image frame to correspond to the configured exposure time, set the readout cycle as a reciprocal number of the exposure time of the image frame such that a readout operation of a previous image frame corresponds to a reset operation of a following image frame among a plurality of successive image frames.

19. The electronic device of claim 17, further comprising a signal line connecting the image sensor and the at least one processor, wherein the at least one processor is configured to transmit a control signal of the reset operation of the image frame or the readout operation of the image frame to the image sensor through the signal line.

* * * * *